UNITED STATES PATENT OFFICE.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

FERTILIZER.

SPECIFICATION forming part of Letters Patent No. 367,732, dated August 2, 1887.

Application filed July 27, 1885. Serial No. 172,843. (No specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in Fertilizers, which are fully set forth in the following specification.

Liquids technically known as "tank-waters," produced by the rendering of meats and fatty substances, contain so much of soluble gelatinous substances that when evaporated the product is so sticky and deliquescent that its utilization as a fertilizer has been abandoned.

My present invention consists in the production from tank-water of a fertilizer free from undue deliquescence and viscidity, which I accomplish by rendering insoluble the gelatinous substances contained in these waters without the loss of any of the solids in solution and without the transformation of them into several different products, each of which products requires to be differently and separately treated for utilization, as is the case when the stickiness is corrected by heat.

In my method of making this new fertilizer by rendering insoluble the gelatinous substances contained in these liquors, I preferably use a solution of sulphate of iron, and for the purpose of ascertaining the minimum quantity to be used I determine, first, the specific gravity of the liquid to be treated; secondly, the proportion of gelatinous substances which it contains.

The class and character of the meats rendered and the tank-water therefrom vary so much in the relative proportions of fibrine and gelatine which they contain that it is necessary to make a chemical test of a sample of tank-waters about to be treated. This test consists in gradually adding to such sample of tank-water a solution of iron of known strength, and in my experience I have found that for one hundred parts of solids in solution in the tank-water it requires from fifteen to twenty per cent. of green copperas, which is added in solution to the tank-water and mixed thoroughly therewith. This compound is then evaporated under 250° to 300° Fahrenheit, preferably by steam, after which it is placed in an open vessel, in thickness of one inch, and for a period of about ten hours is subjected to a heat of about 350° Fahrenheit, when it will become hard, brittle, and easy of pulverization. The heat should not be raised much higher than 350°, because the material would thus again become sticky, blacken, and suffer loss of ammonia. By this means the substances in solution in the tank-waters, with all the nitrogen they contain, are preserved in the resulting non-viscid, non-deliquescent fertilizer, rich in nitrogen, with soluble phosphate and potash.

Instead of using sulphate of iron, as an equivalent I may use the same proportions of chloride of iron, sulphate of aluminum, alum, acetate of lead, or other soluble salts of iron or aluminum, or twenty to thirty per cent. of organic tannins, or five to ten per cent. of chlorine or its equivalent hypochlorides. These are the proportions when either class of these chemicals is used alone; but if used in combinations equivalent proportions of each will take the place of the others.

I am aware that the described chemical ingredients have been used in the treatment of sewage and similar liquids; but such use has been for the purpose of preventing odorous decomposition, and not for rendering insoluble gelatinous compounds, such liquids not usually containing gelatine.

Having described my invention, what I claim is—

The within-described nitrogenous fertilizing material, consisting of the undecomposed coagulated albuminoids of concentrated tank-waters freed from undue deliquescence and viscidity.

JOSEPH VAN RUYMBEKE.

Witnesses:
WM. ZIMMERMAN,
WILLIAM F. JOBBINS.